(12) United States Patent
Zhao et al.

(10) Patent No.: US 11,188,085 B2
(45) Date of Patent: Nov. 30, 2021

(54) VEHICLE CAPSULE NETWORKS

(71) Applicant: Ford Global Technologies, LLC, Dearborn, MI (US)

(72) Inventors: Zhen Zhao, Farmington Hills, MI (US); Ashley Naomi Kleinhans, Highland, MI (US); Ishan Patel, Ann Arbor, MI (US); Gursharan Sandhu, Royal Oak, MI (US); KP Unnikrishnan, Ann Arbor, MI (US); Bryan Roger Goodman, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 140 days.

(21) Appl. No.: 16/361,295

(22) Filed: Mar. 22, 2019

(65) Prior Publication Data

US 2020/0301438 A1   Sep. 24, 2020

(51) Int. Cl.
*G05D 1/02*   (2020.01)
*G06T 7/70*   (2017.01)
*G05D 1/00*   (2006.01)

(52) U.S. Cl.
CPC ......... *G05D 1/0223* (2013.01); *G05D 1/0088* (2013.01); *G05D 1/0246* (2013.01); *G06T 7/70* (2017.01); *G05D 2201/0213* (2013.01); *G06T 2207/20081* (2013.01); *G06T 2207/30236* (2013.01); *G06T 2207/30252* (2013.01)

(58) Field of Classification Search
CPC .. G05D 1/0223; G05D 1/0088; G05D 1/0246; G05D 2201/0213; G06T 7/70; G06T 2207/20081; G06T 2207/30236; G06T 2207/30252; G08G 1/0116; G08G 1/0145; G06K 9/00785
See application file for complete search history.

(56) References Cited

U.S. PATENT DOCUMENTS

| 8,620,987 B2 | 12/2013 | Lakshminarayan et al. |
| 9,842,253 B2 | 12/2017 | Dubuque |
| 10,136,830 B2 | 11/2018 | Geva et al. |

(Continued)

FOREIGN PATENT DOCUMENTS

CN   102436598 A   *   5/2012

OTHER PUBLICATIONS

Canqun Xiang, Lu Zhang, Yi Tang, Wenbin Zou, Chen Xu. MS-CapsNet: A Novel Multi-Scale Capsule Network. IEEE Signal Processing Letters, Institute of Electrical and Electronics Engineers, 2018, 25 (12), pp. 1850-1854. (Year: 2018).*

(Continued)

*Primary Examiner* — Anne Marie Antonucci
*Assistant Examiner* — Andrew J Cromer
(74) *Attorney, Agent, or Firm* — Frank A. MacKenzie; Bejin Bieneman PLC

(57) ABSTRACT

A system, comprising a computer that includes a processor and a memory, the memory storing instructions executable by the processor to detect and locate an object by processing video camera data with a capsule network, wherein training the capsule network includes determining routing coefficients with a scale-invariant normalization function. The computer can be further programmed to receive the detected and located object.

20 Claims, 6 Drawing Sheets

(56) References Cited

U.S. PATENT DOCUMENTS

| | | | | |
|---|---|---|---|---|
| 2012/0106800 A1* | 5/2012 | Khan | ................... | G06K 9/6269 |
| | | | | 382/104 |
| 2015/0134232 A1* | 5/2015 | Robinson | ............. | G08G 1/0145 |
| | | | | 701/117 |
| 2016/0342889 A1* | 11/2016 | Thorson | ................... | G06N 5/04 |
| 2017/0242148 A1 | 8/2017 | Yu et al. | | |
| 2018/0025249 A1 | 1/2018 | Liu et al. | | |

OTHER PUBLICATIONS

Machine Translation of CN102436598A (Year: 2011).*

\* cited by examiner

VEHICLE CAPSULE NETWORKS

BACKGROUND

Vehicles can be equipped to operate in both autonomous and occupant piloted modes. Vehicles can be equipped with computing devices, networks, sensors and controllers to acquire data regarding the vehicle's environment and to operate the vehicle based on the data. Safe and comfortable operation of the vehicle can depend upon acquiring accurate and timely data regarding the vehicle's environment. Vehicle sensors can provide data concerning routes to be traveled and objects to be avoided in the vehicle's environment. Safe and efficient operation of the vehicle can depend upon acquiring accurate and timely data regarding routes and objects in a vehicle's environment while the vehicle is being operated on a roadway.

DETAILED DESCRIPTION

Figure 1:
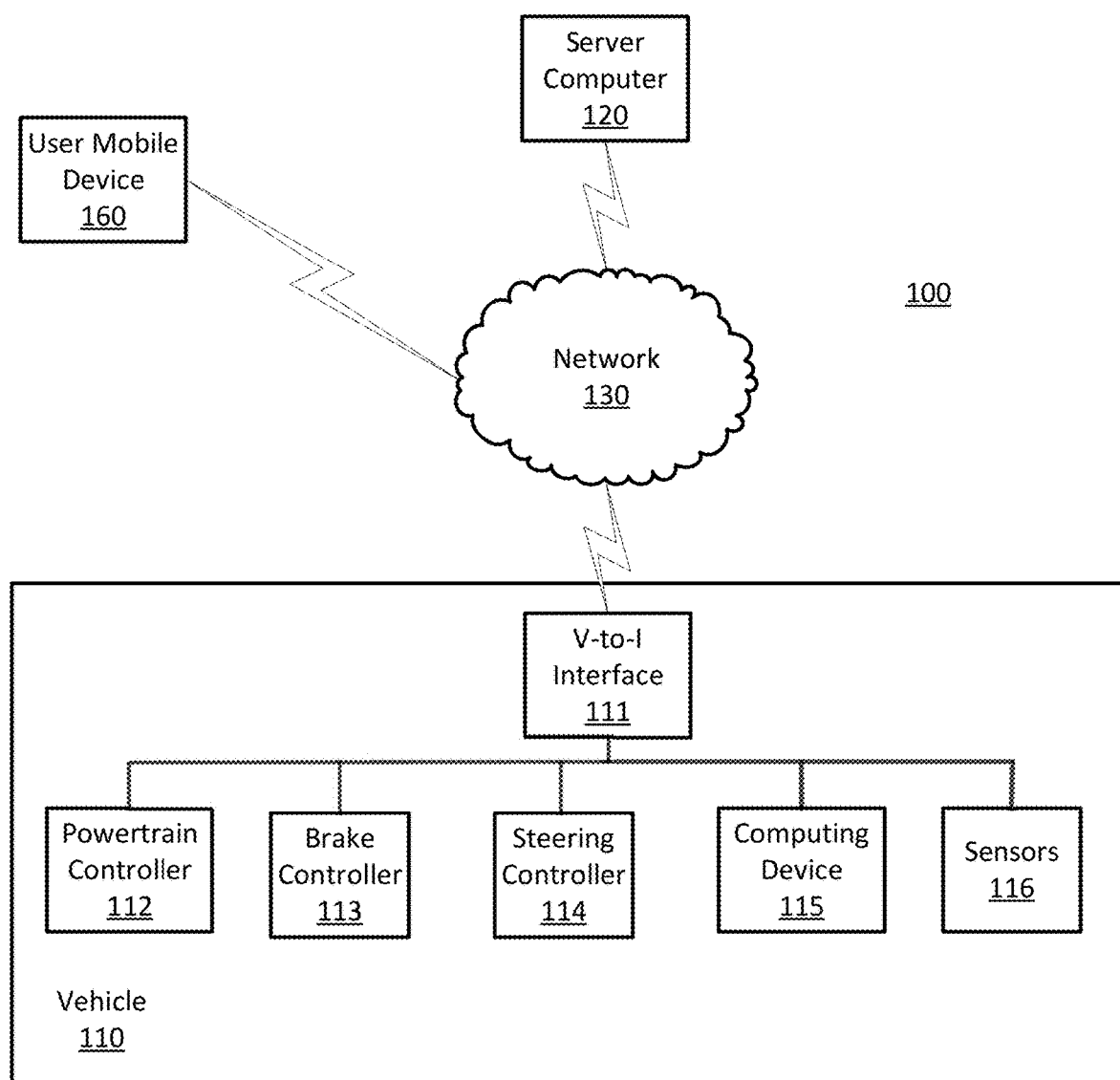
FIG. 1 is a block diagram of an example traffic infrastructure system.

Vehicles can be equipped to operate in both autonomous and occupant piloted modes. By a semi- or fully-autonomous mode, we mean a mode of operation wherein a vehicle can be piloted partly or entirely by a computing device as part of an information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A computing device in a vehicle can be programmed to acquire data regarding the external environment of a vehicle and to use the data to determine a vehicle's path upon which to operate a vehicle based on a vehicle's path in autonomous or semi-autonomous mode. A vehicle's path is a straight and/or curved line that describes successive locations (i.e., locations at different times) of a vehicle on a two-dimensional (2D) plane parallel to the surface of a roadway upon which the vehicle operates. A vehicle can operate on a roadway based on a vehicle's path by determining commands to direct the vehicle's powertrain, braking, and steering components to operate a vehicle so as to move along the path. The data regarding the external environment can include the location of a tracked object in global coordinates. An example tracked object can be another vehicle. The data can be received from a traffic data system and can be based on processing a frame of video camera data with a capsule network.

Disclosed herein is a method, including detecting and locating an object by processing video camera data with a capsule network, wherein training the capsule network includes determining routing coefficients with a scale-invariant normalization function and receiving the detected and located object at a computing device. Training the capsule network can include determining routing coefficients corresponding to routes between capsule layers. Routing coefficients can be determined by grouping routes based on one or more of correlation or clustering following training based on a first training data set, wherein the route connects determined elements in a capsule layer with locations in a subsequent capsule layer. Training the capsule network can include determining routing coefficients with the scale-invariant normalization function within a for-loop. The scale-invariant normalization function can include a Max−min( ) function.

Operating a vehicle can be based on receiving the detected and located object. Operating the vehicle can be based on receiving the detected and located object included determining a predicted location of the object in global coordinates. Determining traffic data can be based on receiving the detected and located object. Video camera data can be acquired with one or more of a stationary video camera included in a traffic infrastructure system and a mobile video camera included in one or more of a vehicle and a drone. Operating the vehicle based on the object location prediction can include determining a vehicle path and combining the object location prediction with the vehicle path. Operating the vehicle based on the location prediction can includes controlling one or more of vehicle powertrain, brakes and steering. The global coordinates can be determined based on a location and a field of view of a video camera. Routing coefficients can be determined by iterating over a process that determines maximum routing coefficients by alternating an expectation step and a maximization step. The expectation step can output a capsule pose and new estimates of routing coefficients.

Further disclosed is a computer readable medium, storing program instructions for executing some or all of the above method steps. Further disclosed is a computer programmed for executing some or all of the above method steps, including a computer apparatus, programmed to detect and locate an object by processing video camera data with a capsule network, wherein training the capsule network includes determining routing coefficients with a scale-invariant normalization function and receive the detected and located object at a computing device. Training the capsule network can include determining routing coefficients corresponding to routes between capsule layers. Routing coefficients can be determined by grouping routes based on one or more of correlation or clustering following training based on a first training data set, wherein the route connects determined elements in a capsule layer with locations in a subsequent capsule layer. Training the capsule network can include determining routing coefficients with the scale-invariant normalization function within a for-loop. The scale-invariant normalization function can include a Max−min( ) function.

The computer can be further programmed to operate a vehicle based on receiving the detected and located object. Operating the vehicle can be based on receiving the detected and located object included determining a predicted location of the object in global coordinates. Determining traffic data can be based on receiving the detected and located object. Video camera data can be acquired with one or more of a stationary video camera included in a traffic infrastructure system and a mobile video camera included in one or more of a vehicle and a drone. Operating the vehicle based on the object location prediction can include determining a vehicle path and combining the object location prediction with the vehicle path. Operating the vehicle based on the location prediction can includes controlling one or more of vehicle powertrain, brakes and steering. The global coordinates can be determined based on a location and a field of view of a video camera. Routing coefficients can be determined by iterating over a process that determines maximum routing coefficients by alternating an expectation step and a maximization step. The expectation step can output a capsule pose and new estimates of routing coefficients.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data (e.g., data provided periodically or substantially in real-time as the vehicle 110 is operated) related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
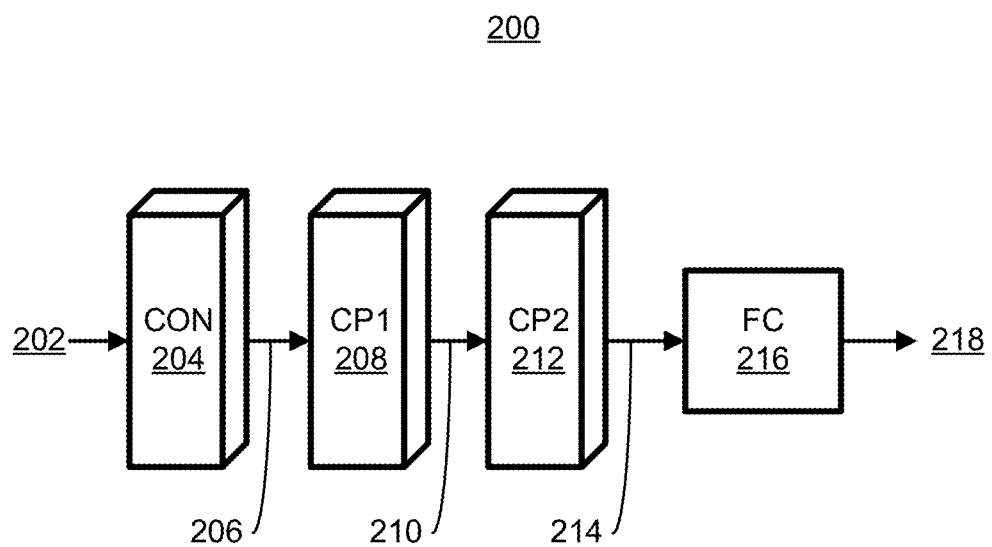
FIG. 2 is a diagram of an example capsule network.

FIG. 2 is a diagram of an example capsule network 200 that can be trained to detect, classify and locate an object based on video camera data. A capsule network 200 is a convolutional neural network that determines object features in image by determining capsules. Capsules are tensors that include a plurality of values corresponding to a plurality features output by convolutional layers in the neural network. The plurality of features included in a capsule can encode data corresponding to identity, location, size and pose of objects in a frame of video data. Convolutional neural networks typically determine relationships between features using pooling to combine results from several adjacent pixels into one pixel. Capsule networks 200 maintain full or substantially full resolution and determine relationships between by routing. Routing is a process for connecting maximum value capsules in a first layer with capsules in a succeeding layer of the capsule network 200 to determine which convolutional weights to associate with an output and resulting loss function during training.

A capsule network 200 is a neural network that includes convolutional layers 204 (CON), first capsule layer 204, (CP1), second capsule layer 208 (CP2), and fully connected layers 216 (FC). Capsule network 200 can input a frame 202 of time series video data, wherein is a time series of video frames 202 acquired at equal time intervals. Capsule network 200 processes time series video image data 202 one video frame 202 at a time. Convolutional layers 204 can process a video frame by applying one or more convolutional filters on input data to determine features. For example, convolutional layers 204 can apply two successive 9×9 filters to input video frame 202 to determine prediction tensors 206. Prediction tensors 206 include predictions corresponding to locations of object features in a video frame 202. Object features in video frame 202 determined by convolutional layers 204 include vehicles and pedestrians, for example. Prediction tensors 206 are input to first capsule layer 208. First capsule layer 208 is a convolutional capsule layer that processes capsules by convolving the capsule with a 9-pixel by 9-pixel convolutional kernel, for example to create output prediction tensors 210.

A prediction tensor is a tensor with dimension (16, 1152, 10), for example, where 16 is the size of a single object feature vector, where an object feature vector has 16 components that each describe a single aspect of an object. The number 1152 denotes the number of capsules i in layer l can be linked to each of 10 capsules in parent layer j. An example prediction tensor includes a prediction vector with 16 values, a capsule number from one to 1152 used to as an index, and 10 capsule numbers that are routing links to capsules in the next level. Each lower-level's capsule's (i) routing coefficients are responsible for linking a single prediction vector to a parent level capsule j. The prediction vectors are learned by the network that includes data regarding classification of features. First capsule layer 208 can determine prediction tensors 210 to output to second capsule layer 212.

Second capsule layer 212 inputs the prediction tensors 210, and processes them to create output prediction tensors 214 in the same manner as first capsule layer 208, i.e., by convolving capsules to form output prediction tensors 214. Output prediction tensors 214 can be measured by summing absolute values of tensor components, for example, and comparing them to other summed prediction tensors, to determine which prediction tensor has most closely matched an object. At training time, a plurality of video frames 202 are input to the capsule network 200 and the resulting capsules are routed to determine the capsules that correspond to real world objects determined based on ground truth.

Ground truth is data corresponding to object detection and location in video data 202 determined by a source independent from the capsule network 200, for example, user input based on identifying and measuring objects by manually. Ground truth can also be determined by using synthetic video frames 202 as input, where the location and size of objects in the video frame 202 is based on user input.

Routing is an iterative process that searches the capsules $c_{ij}$ layer-by-layer to determine routes between layers that produce capsules with object descriptions that are closest to the ground truth. Techniques disclosed herein improve previous routing techniques by employing a scale-invariant Max–min( ) function to determine a maximum value for the capsules, thereby improving the test accuracy of capsule network 200 as compared to techniques that use scale-variant max functions such as a Softmax function. Operation of capsule networks 200 training using scale-invariant Max–min( ) function results in increased object recognition accuracy and allows more stable capsule network 200 training when the number of routing iterations is increased. Techniques described herein also increase the stability of training by allowing increased routing operations without overfitting to the training data. Techniques described herein use a min-max normalization, however, other scale-invariant techniques such as centered max-min normalization or sum normalization can be used.

Based on techniques described herein, higher-level capsules in the network are provided the ability to completely disregard non-essential features presented by lower-level capsules. This can be considered a form of dynamic dropout for the routing coefficients and forces the network to generalize better by determining correct results for a wider variety of input images. In addition, the routing coefficients allow each lower-level capsule to have an independent assignment probability to each of the higher-level capsules. That is, the sum of the probabilities for a single lower-level capsule across each of the higher-level capsules is no longer constrained. This is beneficial for capsule network 200, because a single feature might have equally high probabilities of being assigned to multiple higher-level objects. Details regarding the calculation of a scale-invariant Max-min( ) function are given in relation to FIGS. 3 and 4, below.

Prediction tensors 214 are output to fully-connected layers 216 (FC), where non-linear functions of output prediction tensors 214 are calculated, resulting in output object detection and location data 218. Object detection and location data 218 is determined with respect to the input video data 202. Data regarding the location, direction and size of the field of view of the sensor, along with assumptions regarding the intersection of a plane surface parallel to a roadway is required to determine a geometric projection that will transform pixel locations in an image into real world coordinates.

Figure 3:
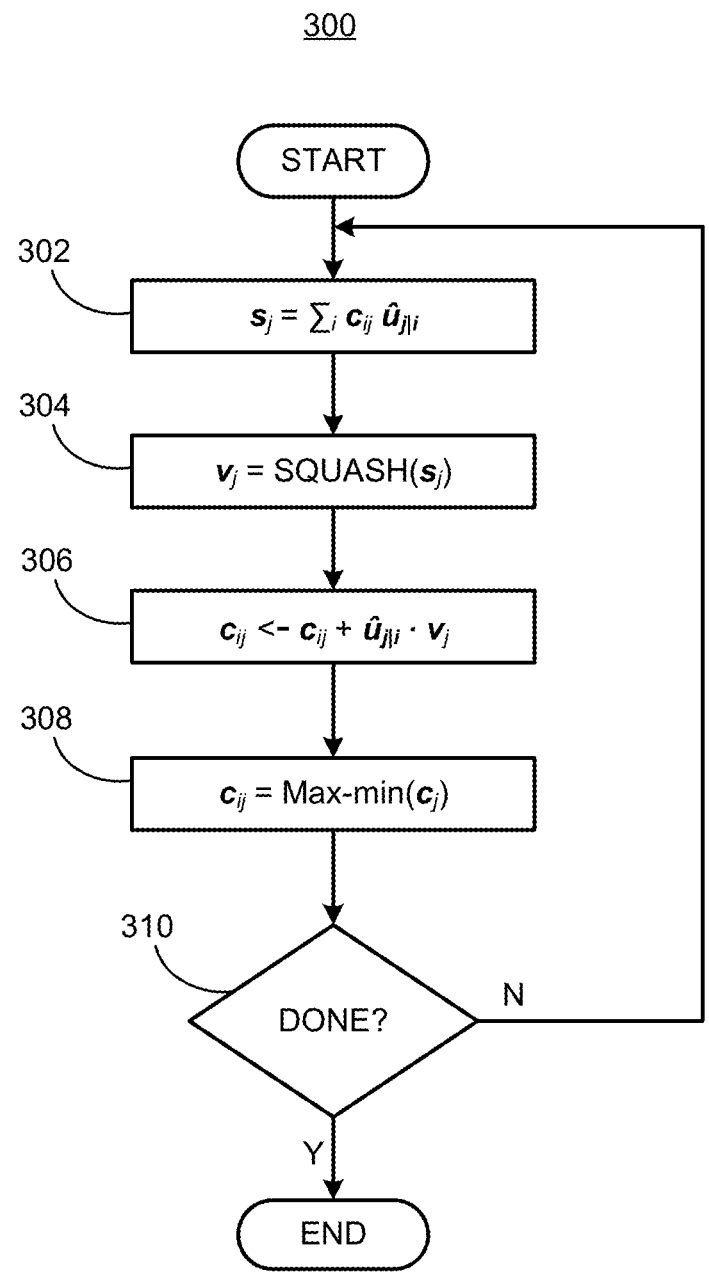
FIG. 3 is a flowchart diagram of an example routing algorithm.

FIG. 3 is a flowchart diagram of a process 300 to determine routing coefficients for a capsule network 200. Process 300 can be implemented by a processor of computing device 115, taking as input data from sensors 116, and executing commands and sending output signals to a server computer 120. Process 300 includes multiple blocks taken in the disclosed order. Process 300 could alternatively or additionally include fewer blocks or can include the blocks taken in different orders. Process 300 will be described in relation to a single input video frame 202. The analyses and explanations that follow if the number of video frames input to the network, either during training or testing. In addition, the values given herein as parameters are examples only and can be changed without changing the process 300.

Process 300 inputs a set of prediction tensors ($\hat{u}_{i|j}$), a number of times to perform the routing procedure (r), and a network layer number (l). The output of the routing algorithm is a set of parent-level capsule tensors ($v_j$). Initial input prediction tensors $\hat{u}_{i|j}$ are calculated from an input video frame 202 by convolutional layers 204. The routing coefficients $c_{ij}$ are initialized to 1.0. When the prediction tensors are fed into the routing algorithm, a single prediction tensor has dimension (16, 1152, 10), for example. Other dimensions can be used without changing the techniques described herein. The first number, 16, denotes the dimension of a single prediction vector (i.e., a single prediction vector is a vector with 16 components and each component describes a specific aspect of an object). The second number, 1152, denotes how many capsules i in layer l can be assigned to each of the 10 capsules, j, in layer l+1. Each lower-level capsule's (i) routing coefficients are responsible for linking a single prediction vector to a parent-level capsule j. The prediction vectors are learned by the network through back-propagation and represent what the network believes an object whole should look like given a set of features. The parent-level capsules j are also learned and represents the actual object whole. Throughout the routing algorithm, the routing coefficients are iteratively calculated to connect the lower-level capsules to the higher-level capsules. With each new image that the network sees, these calculations are performed between each of the 1152 lower-level capsules, i, and each of the 10 higher-level capsules, j.

Process 300 starts at block 302, where routing coefficients $c_{ij}$ are multiplied with each of the prediction vectors and summed over the capsules i to form a matrix, $s_j$, with dimensions (10, 16). Each row corresponds to one of the 10 classes or objects in the dataset that the model is tasked with recognizing and the 16 elements in each row represent the various aspects or features of the object determined by the routing algorithm.

At block 304 the matrix $s_j$ is then squashed using a nonlinear function as given by Equation (1):

$$v_j = \frac{\|s_j\|^2}{1+\|s_j\|^2} \frac{s_j}{\|s_j\|} \tag{1}$$

The squashing function ensures that the length of each of the 10 rows in $s_j$ is constrained between 0 and 1. The squashing function converts $s_j$ into $v_j$, the parent-level capsules that are the outputs from the routing algorithm. Recognition on the input image can be decided by selecting the row in $v_j$ with the greatest length.

At block 306 the routing coefficients $c_{ij}$ are updated using the dot product between the prediction tensors, $\hat{u}_{i|j}$, and the parent-level capsules, $v_j$, and the result of the dot product is added to $c_{ij}$.

At block 308 maximal routing coefficients $c_{ij}$ are determined by applying a Max-min( ) operation defined by equation (2) to the routing coefficients $c_{ij}$ to determine a scale-invariant maximum:

$$c_{ij} = a + \frac{c_{ij} - \min(c_{ij})}{\max(c_{ij}) - \min(c_{ij})} * (b-a) \tag{2}$$

In equation (2), the constants a and b are determined by user input to scale and offset the result. Constant a provides a minimum value for process 300, while constant (b-a) scales the result. For example, a=0.5, b=1.0 would insure that the result of equation (2) would fall between 0.5 and 1.0, when the result of equation (2) would otherwise fall between 0.0 and 1.0, for example. Process 300 improves previous routing algorithms by using equation (2) to determine a maximum $c_{ij}$ instead of a Softmax function, thereby making the maximum calculation scale-invariant, rather than scale-variant, as would be the result from using a Softmax function.

At block 310 process 300 checks an iteration number to determine if the number of iterations equals r, the input number of iterations. If the iteration number is less than r, the iteration number is incremented and process 300 returns to block 302 to process the routing coefficients $c_{ij}$ again. If the iteration number is equal to r, process 300 ends.

Figure 4:
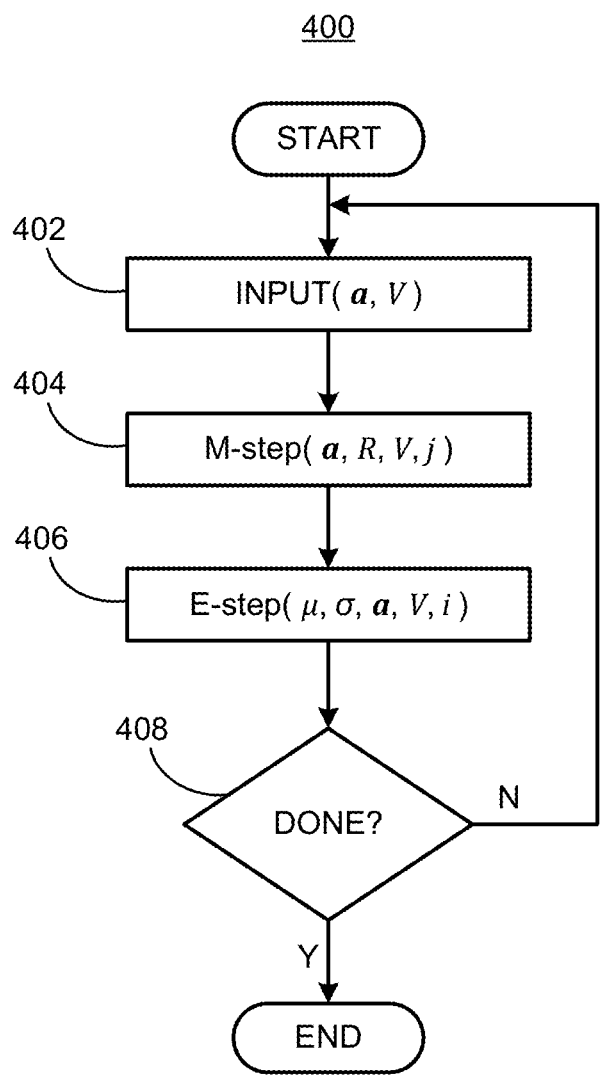
FIG. 4 is a flowchart diagram of another example routing algorithm.

FIG. 4 is a flowchart diagram of a process 400 to determine routing coefficients for a capsule network 200. Process 400 can be implemented by a processor of computing device 115, taking as input data from sensors 116, and executing commands and sending output signals to a server computer 120. Process 400 includes multiple blocks taken in the disclosed order. Process 400 could alternatively or additionally include fewer blocks or can include the blocks taken in different orders. Process 400 will be described in relation to a single input video frame 202. The analyses and explanations that follow if the number of video frames input to the network, either during training or testing. In addition, the values given herein as parameters are examples only and can be changed without changing the process 400.

Process 400 uses expectation-maximization (EM) to link lower-level capsules to higher-level capsules. The input to routing algorithm is a set of activations a and the votes of the capsules V in layer L. Input to the routing algorithm are object features output by convolutional layers as activations a and votes V, and poses of the capsules M for layer L+1. The poses of the capsules in layer L+1 are contained in the variables $\mu_j^h$ and $\sigma_j^h$ (denoted collectively as M in process 400). The capsules from layer L are calculated from the input video frame 202 by a convolutional layer 204 as discussed above in relation to FIG. 3, although the capsules can be calculated using any type of filtering operation that can produce appropriate capsules. In process 400, the variable $R_{ij}$ are the routing coefficients. Throughout the for-loop iterations of the EM-based routing algorithm, the $R_{ij}$'s are dynamically, i.e., in substantially real-time based on input, calculated just as the $c_{ij}$'s are dynamically calculated in the routing procedure of process 300. Just as in process 300, the process 400 improves the calculation of routing coefficients $R_{ij}$ by using a scale-invariant Max–min( ) function to replace a logistic function. Logistic functions are a specialization of a Softmax function and are also scale-variant.

At block 402 a computing device 115 executing process 400 can input a set of activations corresponding to capsules, a, and the votes of the capsules, V, in a layer L, where the activations a and the votes V, are the values corresponding to object features.

At block 404 process 400 performs a maximization step (M-step) based on activations a, routing coefficients R, votes V, and the parent level j according to equations (3)-(7):

$$\forall i \in \Omega_L : R_{ij} \leftarrow R_{ij} * a_1 \quad (3)$$

Routing coefficients $R_{ij}$ are multiplied by the activations $a_i$ for all capsules $\Omega_L$ in a layer L.

$$\forall h : \mu_j^h \leftarrow \frac{\sum_i R_{ij} * V_{ij}^h}{\sum_i R_{ij}} \quad (4)$$

The prediction tensor $\mu_j^h$ is determined by multiplying the routing coefficients $R_{ij}$ times the votes $V_{ij}^h$.

$$\forall h : (\sigma_j^h)^2 \leftarrow \frac{\sum_i R_{ij}(V_{ij}^h - \mu_j^h)^2}{\sum_i R_{ij}} \quad (5)$$

The variance $(\sigma_j^h)^2$ is determined by summing over the squared difference between votes $V_{ij}^h$ and prediction tensor $\mu_j^h$, and normalizing.

$$cost^h \leftarrow (\beta_\mu + \log(\sigma_j^h))\Sigma_i R_{ij} \quad (6)$$

A cost function $cost^h$ can be determined based on equation (6), where $\beta_\mu$ can be determined empirically, by ranking output cost functions $cost^h$ against ground truth.

$$a_j \leftarrow \text{Max-min}(\lambda(\beta_\alpha - \Sigma_h cost^h)) \quad (7)$$

Max–min( ) function is calculated according to equation (2). Parameters $\beta_\alpha$ and $\beta_\mu$ are learned during training time to improve discrimination between maximum and non-maximum values. The inverse temperature $\lambda$ can increase at each iteration according to a fixed schedule determined by user input.

At block 406 process 400 performs an expectation step (E-step) based on prediction tensor $\mu_j^h$, variance $\sigma_j^h$, activations a, votes V, and the parent level j according to equations (8) and (9) to output capsule pose $p_j$ and new estimates of routing coefficients $R_{ij}$ for capsules $\Omega_{L+1}$ in layer L+1.

$$\forall j \in \Omega_{L+1} : p_j \leftarrow \frac{\sum_i R_{ij}(V_{ij}^h - \mu_j^h)^2}{\sqrt{\prod_h 2\pi(\sigma_j^h)^2}} \exp\left(-\sum_h^H \frac{(V_{ij}^h - \mu_j^h)^2}{2(\sigma_j^h)^2}\right) \quad (8)$$

$$\forall j \in \Omega_{L+1} : R_{ij} \leftarrow \frac{a_j p_j}{\sum_{k \in \Omega_{L+1}} a_k p_k} \quad (9)$$

At block 408 an iteration counter is incremented and compared to a maximum count that can be determined by user input. The maximum count can be a small number, for example 20. If the iteration counter is less than or equal to the maximum count, process 400 can loop back to block 402 and repeat blocks 404 and 406. If the iteration counter is greater than the maximum count, process 400 ends.

Figure 5:
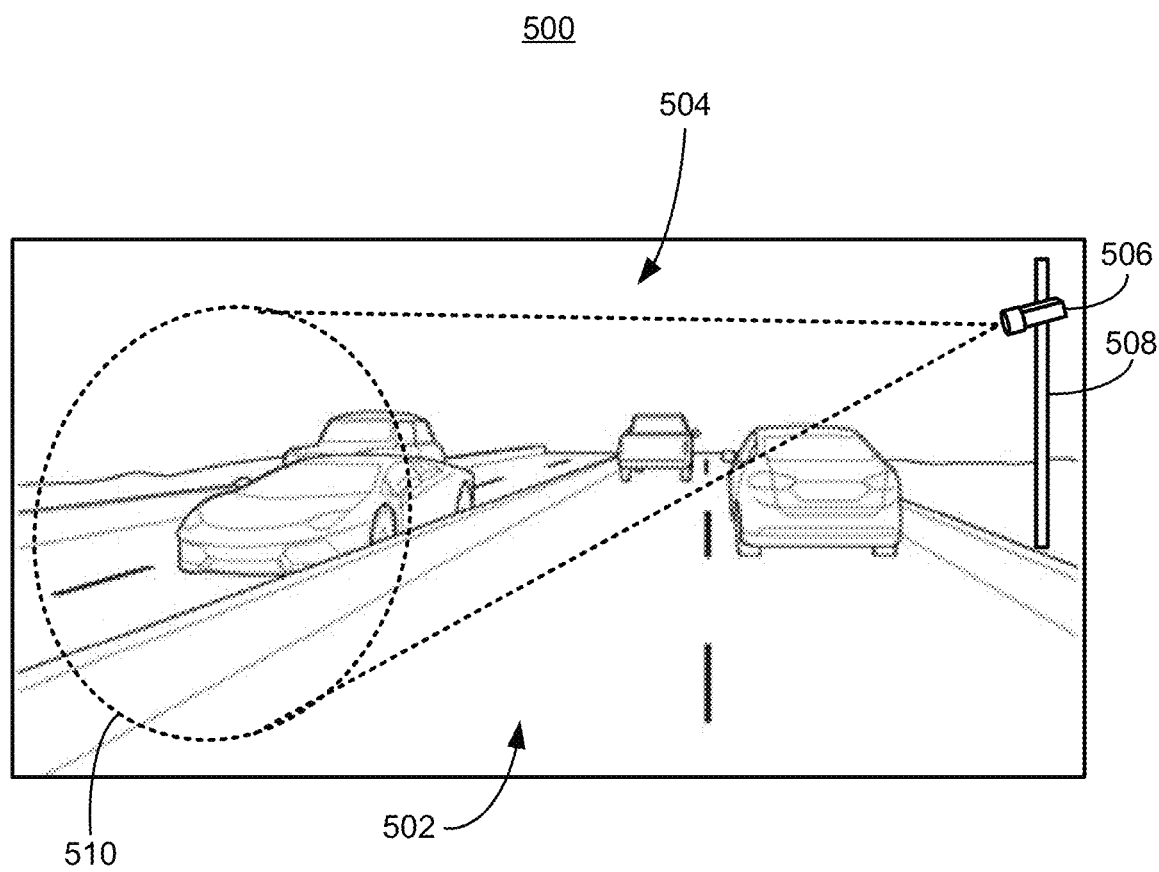
FIG. 5 is a diagram of an example traffic scene with a stationary camera.

FIG. 5 is a diagram of a traffic scene 500. Traffic scene 500 includes a roadway 502, upon which vehicles 504 operate. Traffic scene 500 also includes a stationary video camera 506. Stationary video camera 506 can be mounted on a pole 508, or other stationary structure, including a building, to afford stationary video camera 506 a field of view 510 that includes a portion of roadway 502 and typically including, from time to time, vehicles 504. Stationary video camera 506 can be attached to pole 508 to permit stationary video camera 506 to maintain a substantially unchanging field of view 510 with respect to roadway 502. Stationary video camera 506 can be calibrated to determine the three-dimensional (3D) location, in global coordinates, of the field of view 510. Global coordinates are positional values based on a global coordinate system such as used by a GPS, such as latitude, longitude and altitude, for example. By determining the 3D location of field of view 510 in global coordinates, the 3D location in global coordinates of a region in a stationary video camera data corresponding to an object can be determined, for example. The locations of features in video data can be transformed into global coordinates based on projection equations based on data regarding measured real world locations, a field of view 510 and the magnification of a lens included in stationary video camera 506 to determine the real world locations of locations in video data in global coordinates.

Stationary video camera 506 can be included in a traffic information system 100. A traffic information system 100 can include one or more server computers 120 configured to acquire stationary video camera data and process it to track objects and locate the tracked objects in global coordinates. Traffic information system 100 can also communicate with a vehicle 110 based on the location of the vehicle 110. For example, a traffic information system 100 can communicate with a vehicle 110 based on its proximity to a stationary video camera 506. The traffic information system 100 can determine data regarding a tracked object that can be out of the fields of view of sensors included in a vehicle 110 but might be viewable by the vehicle 110 in the near future, for example.

Object detection and location by a capsule network 200 can be used by a computing device 115 for a variety of tasks related to vehicle operation. Object detection and location data based on video data 202 acquired by a stationary video camera 506 can be downloaded to a vehicle 110 to be used to operate vehicle 110. For example, a vehicle 110 can determine a vehicle path upon which to operate based on a predicted location for an object, where vehicle 110 can detect a collision or near collision between a predicted location of vehicle 110 and a predicted location of an object. Object detection and location data can be acquired from a video camera mounted on a vehicle 110, for example. The vehicle 110 can use the object detection and location data to predict collisions and near-collisions between predicted locations of the vehicle 110 and predicted locations of the object, for example.

Object detection, classification and location data can also be acquired by a video camera mounted on a mobile platform such as a drone. Object detection, classification and location data acquired by a video camera mounted on a drone can be received by a server computer 120 in a traffic information system 100 to determine traffic data. For example, a server computer 120 can determine traffic data like data regarding traffic congestion and traffic accidents based on received object detection, classification, and location and download it to a vehicle 110. Processes that operate vehicles or support vehicle operation based on detecting and locating objects can benefit by improvements in capsule networks 200 including determining maximum routing coefficients using Max–min( ) functions or other scale-invariant techniques as described herein.

Figure 6:
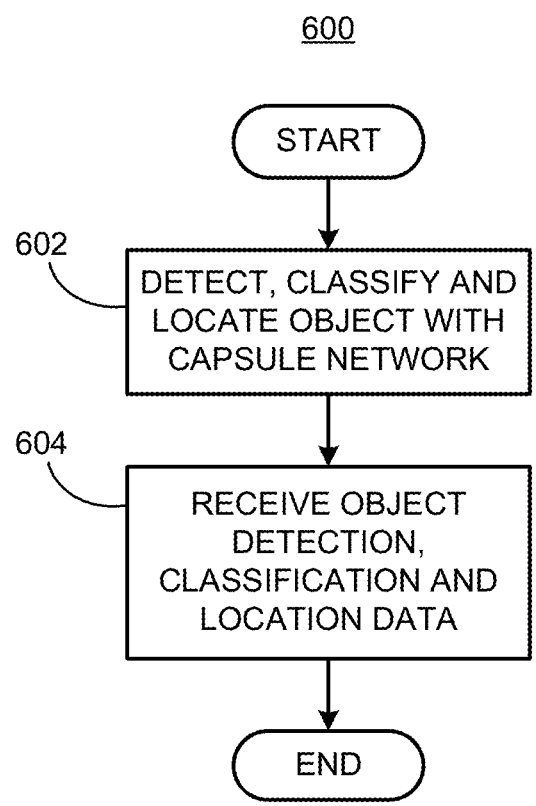
FIG. 6 is a flowchart diagram of a process to determine object locations.

FIG. 6 is a diagram of a flowchart, described in relation to FIGS. 1-5, of a process 600 for determining an object position, tracking an object based on the object position and downloading the object tracking data to a vehicle. Process 600 can be implemented by a processor of a computing device 115 or server computer 120, taking as input data from sensors, and executing commands, and sending object data to a vehicle 110, for example. Process 600 includes multiple blocks taken in the disclosed order. Process 600 could alternatively or additionally include fewer blocks or can include the blocks taken in different orders.

Process 600 begins at block 602, wherein a computing device 115 or a server computer 120 acquires a video image from a video camera including a stationary video camera 506 and inputs it to a trained capsule network 200. Capsule network 200 has been trained using routing coefficient tensors as described above in relation to FIGS. 2-5. Capsule network 200 inputs video image data 202 and can output object detection and location data 218 corresponding to object detection and location data measured with respect to a video frame. Video camera data can be input from a stationary video camera or a mobile video camera. A mobile video camera can be mounted on a vehicle 110 or a drone, for example.

At block 604, server computer 120 can combine object detection and location data 218 output from capsule network 200 with ground truth data regarding the location of roadway 502 with respect to field of view 510 of the stationary video camera 506 in global coordinates to transform the output object detection and location data 218 into global coordinates as discussed in relation to FIG. 5, above. A sequence of object locations in global coordinates acquired at equal time intervals is time series data that can be input to a process such as is known to predict object motion and thereby track the object based on the object locations. For example, a neural network can be trained to input object locations in global coordinates and output predicted object locations. A server computer 120 can download predicted object locations in global coordinates to a vehicle 110 or a vehicle 110 can predict object locations from downloaded object locations. Predictions regarding object locations can be input to processes that determine vehicle paths to permit a computing device 115 in a vehicle 110 to determine a path upon which to operate based on the downloaded object data. For example, a vehicle path can be determined that avoids a collision or near-collision with a predicted object location.

In examples where the video camera data is acquired from a mobile platform, object detection and location data can be transformed into global coordinates based on a location and field of view corresponding to a location and field of view of a video camera included in the mobile platform. Because the platform can be moving when the video camera data is acquired, the video camera data can be time stamped to identify a location of the video camera when the video camera data was acquired. Object detection, and location data acquired from mobile platforms can be downloaded to a vehicle 110 directly or received by a server computer 120 to combine with object detection and location data from other sources to determine traffic data. Traffic data can include a map of a roadway including moving and fixed objects, for example. The moving and fixed objects can include one or more vehicles 110. A traffic infrastructure system 110 can be in communication with a vehicle 110 to download traffic data to a vehicle 110 to assist vehicle 110 in operating on a roadway 502, for example. Following block 604 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   detecting and locating an object by processing video camera data with a capsule network that includes a plurality of capsules arranged in layers, wherein lower-level capsules include prediction tensors that include the size of an object feature vector, a number of the lower-level capsules in a lower-level layer that can be linked to one or more capsules in a higher-level layer, and the number of routing links to the one or more higher-level capsules in the higher-level layer; wherein training the capsule network includes determining routing coefficients with a scale-invariant normalization function which includes determining maximal routing coefficients using a Max-min( ) function and includes expectation-maximization to link the lower-level capsules to the one or more higher-level capsules; and
   receiving the detected and located object at a computing device.

2. The method of claim 1, wherein the capsule network includes further determining that the routing coefficients corresponding to routes between capsule layers.

3. The method of claim 1, wherein routing coefficients are determined by grouping routes based on one or more of correlation or clustering following training based on a first training data set, wherein the grouped routes connect determined elements in a capsule layer with locations in a subsequent capsule layer.

4. The method of claim 1, wherein training the capsule network further includes determining routing coefficients with the scale-invariant normalization function within a for-loop.

5. The method of claim 1, further comprising operating a vehicle based on receiving the detected and located object.

6. The method of claim 5, wherein operating the vehicle based on receiving the detected and located object includes determining a predicted location of the object in global coordinates.

7. The method of claim 1, further comprising determining traffic data based on receiving the detected and located object.

8. The method of claim 1, further comprising acquiring the video camera data with one or more of a stationary video camera included in a traffic infrastructure system and a mobile video camera included in one or more of a vehicle and a drone.

9. A system, comprising a processor; and
   a memory, the memory including instructions to be executed by the processor to:
      detect and locate an object by processing video camera data with a capsule network that includes a plurality of capsules arranged in layers, wherein lower-level capsules include prediction tensors that include the size of an object feature vector, a number of the lower-level capsules in a lower-level layer that can be linked to one or more capsules in a higher-level layer, and the number of routing links to the one or more higher-level capsules in the higher-level layer; wherein training the capsule network includes determining routing coefficients with a scale-invariant normalization function which includes determining maximal routing coefficients using a Max-min( ) function and includes expectation-maximization to link the lower-level capsules to the one or more higher-level capsules; and
      receive a detected and located object at a computing device.

10. The system of claim 9, the instructions including further instructions to determine that the routing coefficients corresponding to routes between capsule layers.

11. The system of claim 9, the instructions including further instructions to determine routing coefficients by grouping routes based on one or more of correlation or clustering following training based on a first training data set, wherein the grouped routes connect determined elements in a capsule layer with locations in a subsequent capsule layer.

12. The system of claim 9, wherein training the capsule network further includes determining routing coefficients with the scale-invariant normalization function within a for-loop.

13. The system of claim 9, wherein operating a vehicle based on predicting an object location includes receiving the detected and located object.

14. The system of claim 13, wherein operating the vehicle based on receiving the detected and located object includes determining a predicted location of the object in global coordinates.

15. The system of claim 9, wherein determining traffic data includes receiving the detected and located object.

16. The system of claim 9, the instructions including further instructions to acquire the video camera data with one or more of a stationary video camera included in a traffic infrastructure system and a mobile video camera included in one or more of a vehicle and a drone.

17. A system, comprising:
means for controlling vehicle steering, braking and powertrain; and
means for detecting and locating an object by processing video camera data with a capsule network that includes a plurality of capsules arranged in layers, wherein lower-level capsules include prediction tensors that include the size of an object feature vector, a number of the lower-level capsules in a lower-level layer that can be linked to one or more capsules in a higher-level layer, and the number of routing links to the one or more higher-level capsules in the higher-level layer; wherein training the capsule network includes determining routing coefficients with a scale-invariant normalization function which includes determining maximal routing coefficients using a Max-min( ) function and includes expectation-maximization to link the lower-level capsules to the one or more higher-level capsules; and
means for receiving the detected and located object at a computing device; and
operating a vehicle based on the detected and located object and the means for controlling vehicle steering, braking and powertrain.

18. The system of claim 17, wherein the capsule network includes further determining routing coefficients corresponding to routes between capsule layers.

19. The system of claim 17, wherein routing coefficients are determined by grouping routes based on one or more of correlation or clustering following training based on a first training data set, wherein the route connects determined elements in a capsule layer with locations in a subsequent capsule layer.

20. The system of claim 17, wherein training the capsule network includes determining routing coefficients with the scale-invariant normalization function within a for-loop.

* * * * *